United States Patent
Hosoda et al.

[11] Patent Number: 6,030,051
[45] Date of Patent: Feb. 29, 2000

[54] TWO-PIECE STEEL WHEEL

[75] Inventors: Toshiharu Hosoda, Ayase; Akira Suzuki, Yokohama; Masaru Kobayashi, Kangawa-ken; Yukio Koseki, Kuki, all of Japan

[73] Assignee: Topy Kogyo Kabushiki Kaisha, Tokyo, Japan

[21] Appl. No.: 08/874,629

[22] Filed: Jun. 13, 1997

[51] Int. Cl.[7] ................................................. B60B 3/02
[52] U.S. Cl. ...................... 301/63.1; 301/95; 29/894.322
[58] Field of Search ............................. 301/62, 63.1, 65, 301/95; 23/894.322, 894.323

[56] References Cited

U.S. PATENT DOCUMENTS

| | | |
|---|---|---|
| 4,610,482 | 9/1986 | Overbeck et al. |
| 5,257,455 | 11/1993 | Iwatsuki ................................ 301/63.1 |
| 5,345,676 | 9/1994 | Ashley, Jr. ........................ 301/63.1 X |
| 5,360,261 | 11/1994 | Archibald et al. ..................... 301/63.1 |
| 5,421,642 | 6/1995 | Archibald ....................... 29/894.322 X |
| 5,558,407 | 9/1996 | Jaskiery .................................. 301/63.1 |
| 5,591,386 | 1/1997 | Jansen et al. ..................... 301/63.1 X |
| 5,639,147 | 6/1997 | Hill et al. ............................... 301/63.1 |
| 5,803,553 | 9/1998 | Wei ....................................... 301/63.1 |

FOREIGN PATENT DOCUMENTS 9-20103  1/1997  Japan.

*Primary Examiner*—Russell D. Stormer
*Attorney, Agent, or Firm*—Pillsbury Madison & Sutro LLP

[57] ABSTRACT

A two-piece steel wheel includes a disk and a rim. At an inboard surface, the disk has a machined surface from an end of a radially outer portion of the disk to a position radially inwardly spaced away from an inside surface of a rim bead seat of the rim. The machined surface is connected via a curved surface to a non-machined surface of a radially inner portion of the disk. The rim bead seat is abutted to the machined surface of the radially outer portion of the disk and welded with the disk. A sealant is coated to the corner of the rim bead set and the disk from an inside of the rim.

4 Claims, 3 Drawing Sheets

TWO-PIECE STEEL WHEEL

BACKGROUND OF THE INVENTION

1. Field of the Invention

The present invention relates to a wheel which is made from steel and is constructed by welding separate members of a disk and a rim (hereinafter, a two-piece wheel).

2. Description of Related Art

Automobile wheels are generally divided into two types: one is a two-piece wheel made from steel or aluminum and the other is an integral casted or forged wheel made from aluminum. The objective wheel of the present invention is the two-piece wheel made from steel.

The conventional two-piece steel wheels have been constructed, as illustrated in FIG. 4, by fitting a radially outer portion 2a of a disk 2 to an inside surface of a rim 1 having two rim flanges 1a. However, since the fitted line of the wheel can be seen from an outboard side of the wheel, thereby degrading its appearance, an integral design type of wheel as illustrated in FIG. 3 has been proposed in U.S. Pat. No. 4,610,482 to solve such problems. The radially outer portion of the wheel 3 has the same shape of a rim flange, and the rim 4 has a rim flange 4a at one end and a rim bead seat 4b at the other end. The rim bead seat 4b at the other end has a radially inwardly extending flange 4c and the rim is welded to the disk of the wheel 3 at the bent portion of the rim bead scat 4b.

However, with the wheel there are still the problems that the number of forming, steps is increased by the step of forming the flange 4c, that the weight of the wheel is increased by the flange 4c, and that the decoration holes should be provided radially inside the flange 4c. Consequently, the effect of the integral design that makes the outboard surface of the wheel look broad is decreased.

To solve such problems, the inventors of the present application have proposed a two-piece steel wheel in Japanese Patent Publication No. HEI 9-20103, as illustrated in FIG. 2. In the wheel, the radially outer portion 5a of the disk 5 which is formed in the shape of a rim flange is machined so as to provide a stepped portion 5b. A straightly extending rim bead seat 6a of the rim 6 is fitted to the stepped portion 5b and an end surface 6b is abutted to the machined inboard surface of the radially outer portion 5a of the disk 5, and, while maintaining that state, the rim 6 and the disk 5 arc welded together from radially outside of the rim 6.

However, with the wheel of FIG. 2, there are still the following problems:

(1) Since the disk has the stepped portion 5b, a stress concentrates at the stepped portion 5b. To endure the concentrated stress, the thickness of the disk has to be increased.

(2) Water and/or mud enter the weld to cause rust through a small gap between the end surface 6b of the rim and the machined surface of the disk 5. To prevent rust, a particular penetration weld has to be developed, which increases the welding cost.

(3) Since the inside surface of the rim bead seat 6a is fitted to the stepped portion 5b of the disk 5, fitting of a relatively higch precision is required, which increases the machining cost.

SUMMARY OF THE INVENTION

An object of the present invention is to provide a two-piece steel wheel which can improve the durability of the weld between the bead seat of the rim and the radially outer portion of the disk.

A two-piece steel wheel according to the present invention includes a steel disk having a radially outer portion that has the shape of a rim flange, and a steel rim having a rim bead seat at a first end of the rim and a rim flange at a second end of the rim. The rim is welded to the disk at the first end of the rim.

At an inboard surface of the disk, the disk has a machined surface from an end of the radially outer portion of the disk to a position radially inwardly spaced away from an inside surface of the rim bead seat and a non-machined surface radially inside the position. The machined surface is connected to the non-machined surface via a curved machined surface.

The rim bead seat at the first end of the rim extends straight up to an axial end of the rim bead seat.

The rim bead seat at the first end of the rim has an end surface. The end surface of the rim bead seat is abutted to the machined surface of the radially outer portion of the disk and is welded to the disk from outside of the rim, and A sealant is coated to the abutted portion of the end surface of the rim bead seat to the machined surface of the radially outer portion of the disk from inside of the rim.

In the above-described steel wheel, since the machined portion is connected to the non-machined surface via the curved portion, the radially outer portion of the disk has no stepped portion. As a result, no stress concentration and no crack initiation at such stepped portion occur. Therefore, the durability of the wheel is improved.

Further, since the sealant is coated, water and/or mud are prevented from entering the root of the weld from the inside of the weld. As a result, rust at the weld is prevented and the durability of the wheel is improved.

Further, since the inside surface of the rim bead seat is not fitted to a stepped portion, but is abutted to the machined surface of the disk, machining accuracy is not required.

Further, the wheel of the present invention has the same effect as that of Japanese Utility Model Publication HEI 3-72001. More particularly, since the rim bead seat has no radially inwardly extending flange, the step for forming the flange is removed and the weight of the rim is decreased. Further, the decoration holes can be perforated at an outer portion of the disk thereby providing an excellent appearance.

BRIEF DESCRIPTION OF THE DRAWINGS

The above and other objects, features, and advantages of the present invention will become more apparent and will he more readily appreciated from the following detailed description of the preferred embodiment of the present invention in conjunction with the accompanying drawings, in which.

DETAILED DESCRIPTION OF THE PREFERRED EMBODIMENT

Figure 1:
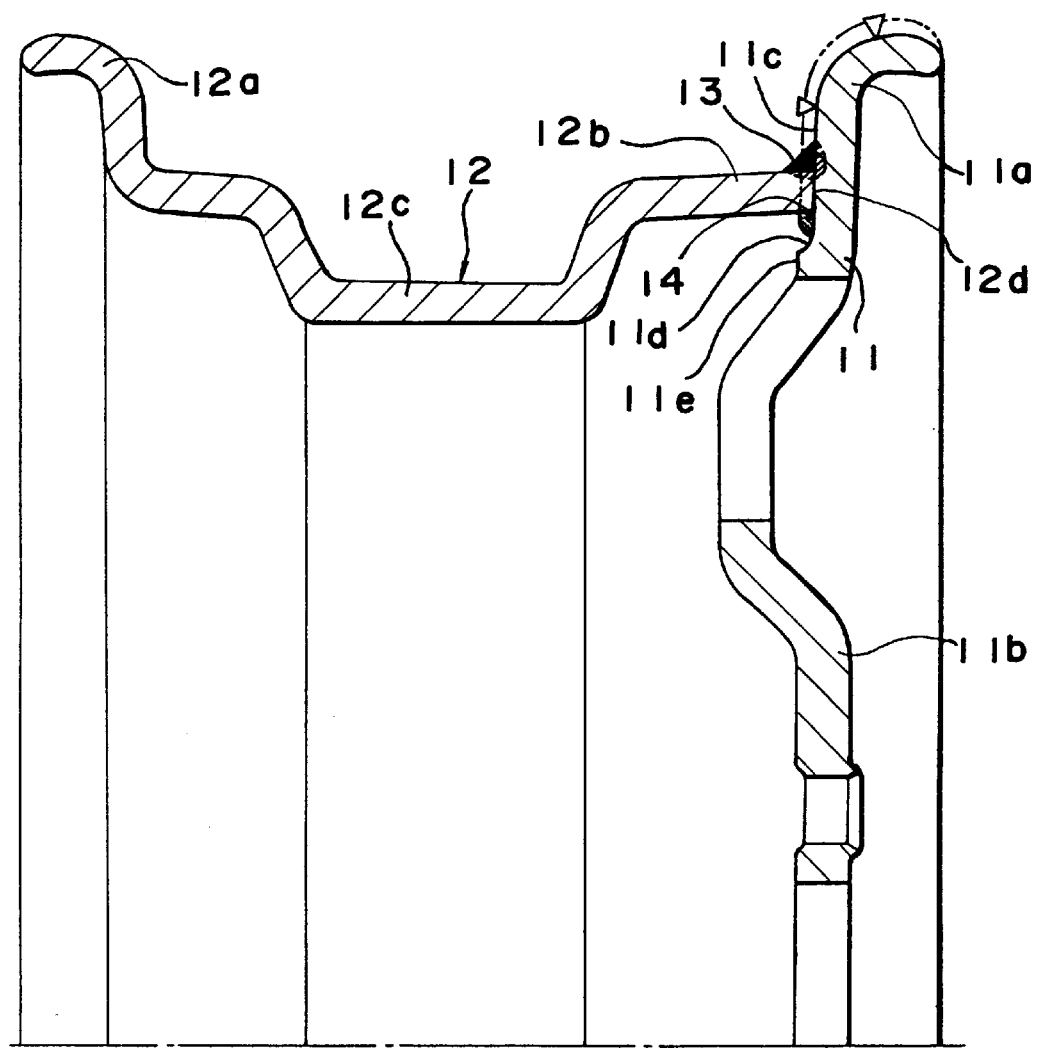
FIG. 1 is a cross-sectional view of a two-piece wheel according to one embodiment of the present invention.
Figure 2:
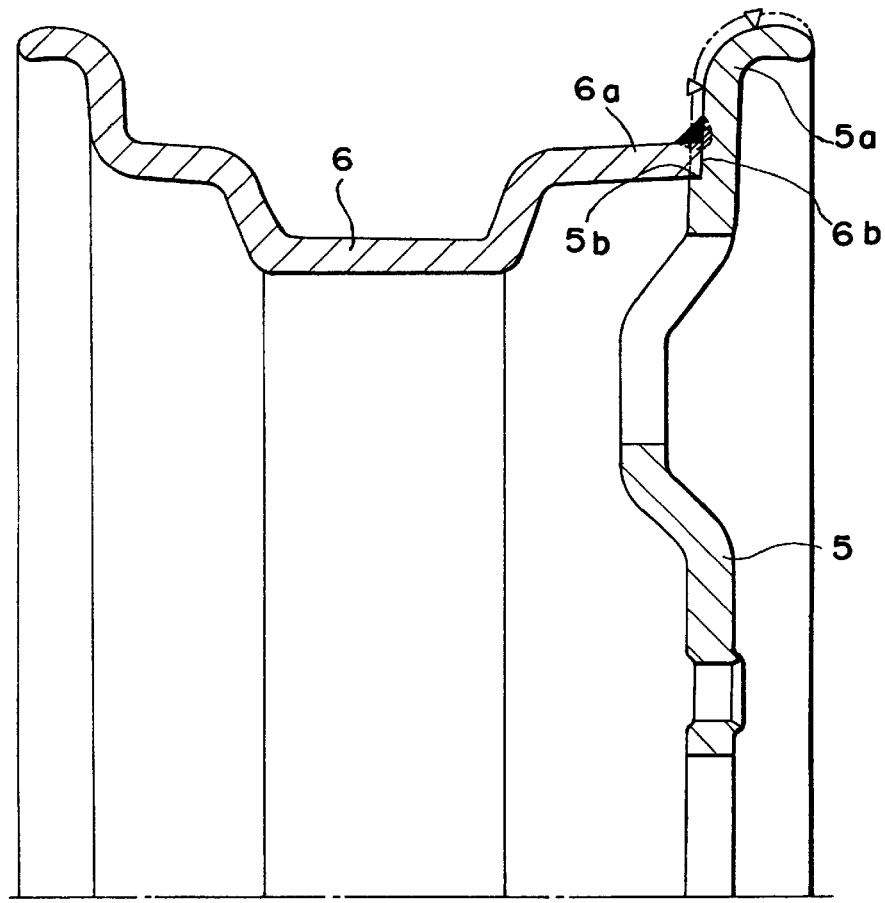
FIG. 2 is a partial cross-sectional view of the two-piece wheel of Japanese Utility Model Publication HEI 3-72001.

As illustrated in FIG. 1, a two-piece steel wheel according to onc embodiment of the present invention includes ai disk 11 and a rim 12 which are made from steel. The rim 12 is made by cutting, a coiled steel plate at a predetermined length, curving the cut flat steel plate, butt-welding the opposite ends of the curved plate to form a cylindrical rim material, and forming the rim material to the shape of a rim. The rim 12 has a rim head seat 12b at a first end and a rim flange 12a at a second end. The rim 12 includes a drop portion 12c between the rim bead seat 12b at the first end and another rim bead seat connected to the rim flange 12a at the second end. The disk 11 includes a radially outer portion 11a which is formed to the shape of a rim flange. The disk 11 is made by press-forming a flat steel plate.

The radially outer portion 11a of the disk 11 has, at an inboard surface of the disk, a machined surface 11c from an end of the radially outer portion 11a of the disk 11 to a position radially inwardly spaced away from an inside surface of the rim bead seat 12b. The disk 11 has, at the inboard surface of the disk, a non-machined surface 11e radially inside the position radially inwardly spaced away from an inside surface of the rim bead seat 12b. The machined surface 11c is connected to the non-machined surface 11e via a curved machined surface 11d.

A thickness of the portion having the machined surface 11e of the radially outer portion 11a is substantially equal to a thickness of the rim head seat 12b of the rim 12. The portion having the non-machincel surface 11b of the disk 11 has a greater thickness than the rim head seat 12b of the rim 12.

The radially outer portion 11a of the disk 11 and the rim flange 12a at the second end of the rim 12 have a substantially equal thickness. Therefore, the flanges of the wheel have a substantially equal thickness.

The rim head seat 12b at the first end of the rim 12 extends straight up to the end of the rim bead scat and has an end surface 12d in which no particular beveling is formed or machined. The rim bead scat 12b at the first end of the rim 12 is abutted at the end surface 12d to the machined surface 11c of the radially outer portion 11a of the disk 11 and is welded with the disk 11. Reference numeral 13 illustrates the weld. The weld 13 is a fillet weld and is conducted from an outside of the rim to the corner between the outside surface of the rim bead seat 12b and the machined surface 11c of the disk 11.

A sealant is coated to a corner between the inside surface of the rim bead scat 12b at the first end of the rim and the machined surface 11c of the radially outer portion 11a of the disk 11 from an inside of the rim bead seat 12b.

Technical effects and/or advantages of the wheel of the present invention will now be explained.

Since the machined surface 11e has no stepped portion and is connected via the curved portion 11d to the non-machined portion 11e, no stress concentration and no crack initiation are produced in a corner of such stepped portion. As a result, durability of the wheel is improved.

Further, since the sealant is coated to the weld 13 from the inside of the rim 12, water and/or mud are prevented from entering the root of the weld 13 through a small gap between the end surface 12d of the rim bead seat and the machined surface 11c of the radially outer portion 11a of the disk 11. As a result, rust generation at the weld is prevented and durability of the wheel is improved.

Further, since the rim bead seat 12b is not fitted to a stepped portion, but is only abutted to the machined surface 11c in the axial direction, no dimensional accuracy for fitting is required and the manufacturing cost is decreased.

Further since the rim 12 has no radially inwardly extending flange (4c in FIG. 3) at the end of the rim bead seat, a step for bendling the rim bead scat to form the flange 4c is not required and the weight of the rim is decreased by the weight of the flange 4c. Weight reduction is desirable from the viewpoint of lightening the automobile. The end surface of the flange 4c of the conventional rim is deformed during formation of the flange 4c, fitting accuracy of the rim onto the disk is not good and usually needs to be machined. However, such machining of the wheel of the present invention, having no such flange 4c, is not required.

Figure 3:
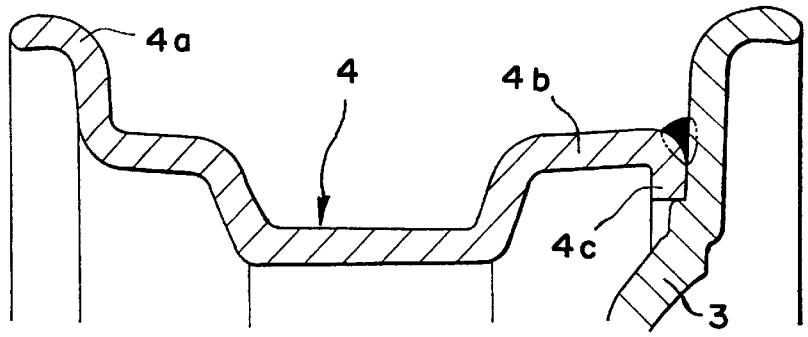
FIG. 3 is a partial cross-sectional view of the two-piece wheel that has a disk having a radially outer portion formed in the shape of a rim flange.
Figure 4:
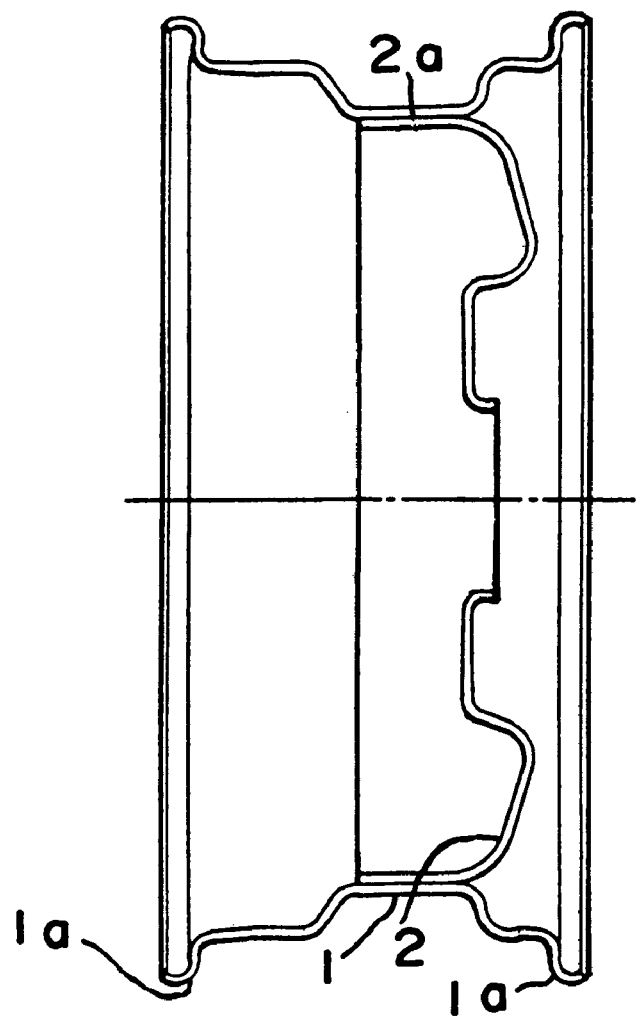
FIG. 4 is a cross-sectional view of the conventional two-piece wheel.

Further, in the wheel having the radially inwardly extending flange 4c, the decoration holes should be perforated radially inside the radially inner edge of the flange 4c. As a result, the radial size of the wheel looks to be small, despite the desire for the wheel to look broad in the radial direction. However, since the wheel of the present invention has no radially inwardly extending flange 4c, the decoration holes can be positioned at a radially outer portion of the front surface of the wheel so long as the holes do not interfere with the inside surface of the straight extending rim head seat 12b. Furthermore, since the thickness of the radially outer portion 11a of the disk 11 and the thickness of the rim flange 12a of the rim 12 are substantially equal to each other, the flange 11a and the flange 12a have about an equal thickness. As a result, it becomes possible to fix the balance weight to the flanges 11a and 12a, which facilitates balancing the rotation of the wheel. More particularly, since a wheel is rotated at a high speed when mounted to an automobile, the wheel is confirmed to be in balance by testing and if necessary, a balance weight is fixed to the flange of the wheel. When a large radial load acts on the disk 11, the disk 11 is increased in thickness and is greater in thickness than the rim 12. If the thickness of the radially outer portion of the disk is substantially equal to the thickness of the radially inner portion of the disk as shown in FIG. 3, the thickness of the flange formed in the disk and the thickness of the flange formed in the rim arc different from each other, which makes balancing by the balance weight difficult. However, since the thickness of the flange 11a and the thickness of the flange 12a ire substantially equal to each other in the wheel according to the present invention, the same balance weight having the same weight and the same configuration as each other can be used in balancing. This makes balancing easy.

Although the present invention has been described with reference to a specific exemplary embodiment, it will be appreciated in the art that various modifications and alterations can be made to the particular embodiments shown. without materially departing from the novel teachings and advantages of the present invention. Accordingly, it is to be understood that all such modifications and alterations are included within the spirit and scope of the present invention as defined by the following claims.

What is claimed is:

1. A two-piece steel wheel comprising:

a steel disk having a radially extending outer portion having the shape of a rim flange and a radially outer end; and a steel rim having an outer surface and having a rim bead seat having an inside surface at a first end of said steel rim and a rim flange at a second end of said steel rim, said steel rim being welded to said disk at said first end of said steel rim, a weld between said steel rim and said steel disk being located on the outer surface of said steel rim, wherein said steel disk defines an inboard surface having a machined surface between the radially outer end of said radially extending outer portion of said steel disk and a position radially inwardly spaced away from said inside surface of said rim bead seat, a non-machined surface is spaced radially inside said position, said machined surface being connected to said non-machined surface by a curved surface, wherein said rim bead seat at said first end of said steel rim extends substantially linearly to an axial end of said rim bead seat, and wherein said rim bead seat at said first end of said steel rim has an end surface, said end surface of said rim bead seat being abutted to said machined surface of said radially outer portion of said steel disk and being welded to said steel disk from the outside surface of said steel rim, and wherein any one of a water-tight sealant a mud-tight sealant, and a water and mud-tight sealant disposed only at a corner defined by where said end surface of said rim bead seat abuts said machined surface of said radially extending outer portion of said steel disk, wherein said sealant is located radially opposite to said weld so as to prevent degradation of the weld.

2. A two-piece steel wheel according to claim 1, wherein said radially extending outer portion of said steel disk and said rim bead seat at said first end of said steel rim have a substantially equal thickness.

3. A two-piece steel wheel according to claim 1, wherein said radially extending outer portion of said steel disk and said rim flange of said steel rim have a substantially equal thickness.

4. A two-piece steel wheel according to claim 1, wherein the weld between said rim bead seat of said steel rim and said machined surface of said radially extending outer portion of said steel disk is a fillet weld.

* * * * *